United States Patent [19]
Pyper

[11] Patent Number: 5,032,261
[45] Date of Patent: Jul. 16, 1991

[54] COMPACT BIOFILTER FOR DRINKING WATER TREATMENT

[75] Inventor: Gordon R. Pyper, South Hero, Vt.

[73] Assignee: Dufresne-Henry, Inc., Vt.

[21] Appl. No.: 441,310

[22] Filed: Nov. 27, 1989

Related U.S. Application Data

[63] Continuation of Ser. No. 198,167, May 24, 1988, abandoned.

[51] Int. Cl.⁵ .............................................. B01D 24/12
[52] U.S. Cl. ................................... 210/137; 210/266; 210/281; 210/286; 210/289; 210/293
[58] Field of Search ................. 210/283, 240, 291-294, 210/484, 792, 807, 110, 137, 202, 203, 258, 260, 275, 277, 281, 282, 284-286, 287, 289

[56] References Cited

U.S. PATENT DOCUMENTS

| | | | |
|---|---|---|---|
| 3,623,978 | 11/1971 | Boze et al. | 210/283 X |
| 4,222,877 | 9/1980 | Silva | 210/484 X |
| 4,260,426 | 4/1981 | Werfelman | 210/293 X |
| 4,664,812 | 5/1987 | Klein | 210/283 |
| 4,749,479 | 6/1988 | Gray | 210/291 X |
| 4,765,892 | 8/1988 | Hulbert et al. | 210/290 |

OTHER PUBLICATIONS

Witherell, L. E. and Herbert, L. M., "An Epidemiological Investigation of Two Outbreaks of Giardiasis in Vermont During 1974," *Journal of the New England Water Works Assn.* vol. 91, No. 2, pp. 102-118, (Jun. 1977).

Abstract, "Small H₂O Systems Technology Seminar," U.S. EPA, MERL, Cincinnati, Ohio (Apr. 21-23, 1982).

Anon, "Development of Basic Data and Knowledge Regarding Organic Removal Capabilities of Commercially Available Home Water Treatment Units Utilizing Activated Carbon": Phases 1-3.

*Primary Examiner*—Tom Wyse
*Attorney, Agent, or Firm*—Davis, Bujold & Streck

[57] ABSTRACT

A filtration system for filtering out bacteria, Giardia cysts, turbidity and other impurities in raw water supplied to a home or the like including a sealed container divided into an upper and a lower chamber by a support plate, the support plate supporting a quantity of filter material sufficient for filtering out undesired bacteria, turbidity and other impurities from the raw water; the sealed container having a raw water inlet pipe communicating with an inlet area above the filter material for supplying the raw water, and a filtered water outlet pipe communicating with the lower chamber for exhausting filtered water from the container; and further including a geofilter cloth provided on top of the filter material for supporting a biological "schmutzdecke" growth thereon which, along with the filter material, filters out bacteria, turbidity, Giardia cysts and other impurities. The sealed container also includes a quick drainage pipe and a treated water supply which are provided for cleaning of the filtration system.

20 Claims, 1 Drawing Sheet

COMPACT BIOFILTER FOR DRINKING WATER TREATMENT

This invention was made with Government support under ISI-86-00914 awarded by the National Science Foundation. The Government has certain rights in this invention.

This is a continuation of copending U.S. application Ser. No. 07/198,167 filed on May 24, 1988, now abandoned.

FIELD OF THE INVENTION

This invention relates to a drinking water filter system for use on a small scale, such as in a home, a small commercial filtering facility or the like, to provide relatively safe and sanitary drinking water which is reduced to acceptable levels of bacteria, Giardia cysts, turbidity and other impurities.

BACKGROUND OF THE INVENTION

There are many small commercial water filtering systems in use throughout the United States and some of these systems provide questionable drinking water to consumers. Many of these small filtering systems exist where the surface and shallow ground water quality tend to be high, such as New England, Pennsylvania, Colorado and the Northwest. The water provided by these systems appears to be acceptable, however, without adequate bacterial and chemical testing the actual water quality is unknown. Recent reports indicate that there has been an increased amount of waterborne disease since 1961 and this trend particularly applies to small water systems. As the population continues to increase, there are fewer and fewer water sources in the United States where the water supplies can be adequately protected from contamination. Moreover, as man continues to populate the water sheds, adequate water treatment is becoming more and more necessary for surface and spring water supplies.

Indigenous animals may also contribute to contamination of water supplies and one specific problem is the occurrence of Giardia cysts. Many animals, particularly beaver and muskrat, serve as a reservoir or carrier of this organism and an increase in Giardia cyst cases has been reported over the past few years. The outbreaks have tended to occur more frequently with consumers of small water systems or where the water is provided to a consumer directly from a clear spring, brook, pond or lake, after being treated with only chlorine, if treated at all. In the case of the Giardia cyst, only excessive chlorination will affect the cyst and normal chlorination is virtually ineffective. Moreover, unlike bacterial exposure, the injestion of a very few Giardia cysts will usually produce a parasitic disease.

The probability of small water system users becoming exposed to this organism is increasing daily. Moreover, the cold water areas of this country are considered to be the most susceptible to this type of contamination and filtration followed by disinfection, such as chlorination, is now considered the primary effective barrier against Giardia cysts. The small water systems have a difficult time meeting acceptable bacterial and turbidity criteria which are required for acceptable disease-free drinking water. Therefore, if the small water treatment systems are to provide safe and potable water, some form of treatment beyond disinfection is required.

Presently there are many methods of treating water to remove bacteria, turbidity, and other contaminates and impurities. Many of these systems are extremely effective in purifying virtually any source of water. However, the associated costs and the required technical know-how are the main limiting factors of the high technology systems, and these factors generally are prohibitively expensive for small water systems.

DESCRIPTION OF THE PRIOR ART

The following art was uncovered in a prior art search performed for this invention: U.S. Pat. No. 862,156 relates to a water filtering apparatus which includes a shaft arrangement carrying fingers which are used to agitate the packed filtering media enclosed between the diaphrams. This shaft/finger arrangement facilitates filtering of the liquid and cleaning of the filtering apparatus. U.S. Pat. No. 1,613,746 features a tank having a top and bottom grating which supports respective screens. The gratings are spaced from one another and support a granulated filtering material therebetween. The fluid to be filtered is supplied by an inlet and it passes through the granulated material before being exhausted out through an outlet.

U.S. Pat. No. 2,266,363 relates to an apparatus for producing filaments wherein a synthetic material is introduced into a duct and passed through a finely divided inert material supported between two screens before being exhausted out through orifices. The purpose of the inert material is to filter out lumps and foreign material so that a uniform flow through the orifices is achieved. U.S. Pat. No. 2,388,668 teaches a liquid filter for reconditioning solids such as those discharged from a washing machine. The liquid discharge is supplied by an inlet pipe into an area defined by a fiber bag which is supported above the top screen. The fluid then passes through a pad, an upper screen, a filtering agent, a cloth, a screen and a flange into a lower chamber where it is exhausted out through an outlet pipe.

U.S. Pat. No. 2,529,398 teaches a water purifying and conditioning system which removes dirt, scales and other impurities from a water system. The water enters through an inlet and is forced to the bottom of the tank and it then flows upwardly through a bottom plate, a wire screen, a cloth disc, a first absorption and filtering material, a second disc, an ion exchange material, a cloth disc, a screen, and then through perforations before being discharged through an outlet bushing. U.S. Pat. No. 3,342,340 teaches a water conditioning system for humans in which a coupling is attached to a fixture. The water enters the system through an axial bore and passes upwardly through a screen material, a porous pad, a lower water treating zone, a porous pad, an upper water treating zone, a porous pad and a screen material before being discharged by a nozzle.

U.S. Pat. No 4,673,507 teaches a process and system for treating liquid in which the particle size and degree of packing of the fluid bed are selected to achieve a substantially even fluid flow distribution through the unit. The fluid enters through a port and is distributed by a header and then passes through a screen, a resin bed, a second screen and a second header. Thereafter, the filtered liquid is discharged through a second port for use. The reference also discloses three methods for overpacking the resin bed and four examples on how to evaluate the flow distribution of the apparatus. None of the above discussed prior art relates to a system or method for obtaining disease-free water and recently there has been a considerable amount of interest in obtaining a small and relatively simple system for obtaining the same. Another prior art system is a slow sand filter which involves the passage of untreated raw water through a bed of sand (at a velocity of approximately 0.08 m/hour) whereby particulate matter, bacteria and pathogenic organisms are filtered out. The system is relatively simple, requires little attention, and produces reliable results even when neglected and is capable of removing bacteria and turbidity to the 95-99.9 percent level. However, there are some disadvantages with the slow sand filter process in that the water source must be of fairly good quality, i.e. have good color, low turbidity and bacteria and have other acceptable characteristics. A second disadvantage is that slow sand filters are relatively large in size and this prohibits it from being used in the home or the like. Thirdly, the initial cost for such a system is relatively high when compared to the costs of obtaining water from wells, springs and other surface water supplies which are relatively "pure". Fourthly, slow sand filters require a labor intensive cleaning process in which, once every six months or so, the top two to three inches of sand filtering media are scraped off and replaced due to contamination.

Moreover, a traditional slow sand filter involves 18 inches of gravel for the underdrain, 40 inches of sand over the gravel and 48 inches of water over the sand. This produces a filter height of about 9 feet, and 10 to 11 feet with free board. For a home filtering system, a column this height is extremely difficult if not impossible to clean properly. Some modifications have been suggested, however, there is not enough research done in this area to insure that the proposed size reductions will provide safe and palatable drinking water. Further, nothing has been done with respect to the question of removing Giardia cysts.

The presence of high turbidity and other contaminants in the water has caused significant operating problems and, as a result, slow sand filters are now being replaced by high technology filtering methods such as coagulation and filtration, diatomaceous earth filtration, reverse osmosis and others. These high technology methods can handle most large scale water quality problems but their methods are not readily applicable to the small water supply systems such as those contemplated by the present invention.

SUMMARY OF THE INVENTION

One aspect of the present invention is to provide a filtering system for filtering out bacteria, turbidity and other impurities in a raw water supply for a home or the like, said system comprising a sealed container divided into at least an upper and a lower chamber by support means, said support means supporting thereon a quantity of filter material sufficient to filter out undesired bacteria, turbidity and other impurities from the raw water; said sealed container having water inlet means communicating with an inlet area above said filter material for supplying the raw water, and filtered water outlet means communicating with said lower chamber for exhausting the filtered water from the container; said support means including a first geofilter cloth which supports the filter means and a second geofilter cloth which is provided on top of the filter material, said geofilter cloths supports a biological "schmutzdecke" growth thereon to thereby filter out bacteria, turbidity and other impurities. The biological growth occurs throughout the filter material but appears to be more prevalent in the vicinity of top geofilter cloth.

An object of the present invention is to provide a small, compact filtration system which maintains the water treatment characteristics of conventional slow sand filtration systems while simplifing the operation and maintenance requirements.

A further object of the invention is to provide a filtering system which removes bacteria, turbidity and other impurities by growing a bacterial growth, referred to as a "schmutzdecke", on an inert support medium and in the bed of the filter material. The bacterial growth, in turn, improves upon the filtration characteristics of the filter system since the bacterial "schmutzdecke" growth helps filter out and break down impurities and other particulate matter.

A still further object of the invention is to provide a system which is quickly and easily cleaned due to its small size, and minimizes contamination of the filter medium, while still being large enough to provide a sufficient amount of drinking water to the consumer.

DESCRIPTION OF THE DRAWINGS

In order that the invention may be more clearly understood, reference will now be made to the accompanying drawing in which the preferred embodiment of the invention, not drawn to scale, is shown by way of example, wherein:

Turning now to FIGURE 1 of the drawing, a filtration apparatus of the form provided by the present invention is shown and it includes a sealed container 10 having a bottom portion 11, sidewall portion 12 and removable cover 13. The removable cover 13 is hinged at 15 on a top side of the sidewall portion 12. The opposite side of the cover carries a latch device 16 so that the cover 13 may be securely fastened to seal the top portion of the container 10. A gasket (not shown) can be provided between the cover and the top sidewall portion of the container to ensure that a tight seal is achieved. The cover 13 can carry, if desired, an air relief valve 58 for removing any air bubbles from the filtration system. The hinge and latch arrangement shown in FIGURE 1 is only one way of providing a quick way of opening the sealed container 10 to provide access to the interior thereof for cleaning and/or replacement of cloth 30; other arrangements, such as bolting the cover down with a plurality of quick release nuts, are also possible.

Figure 1:
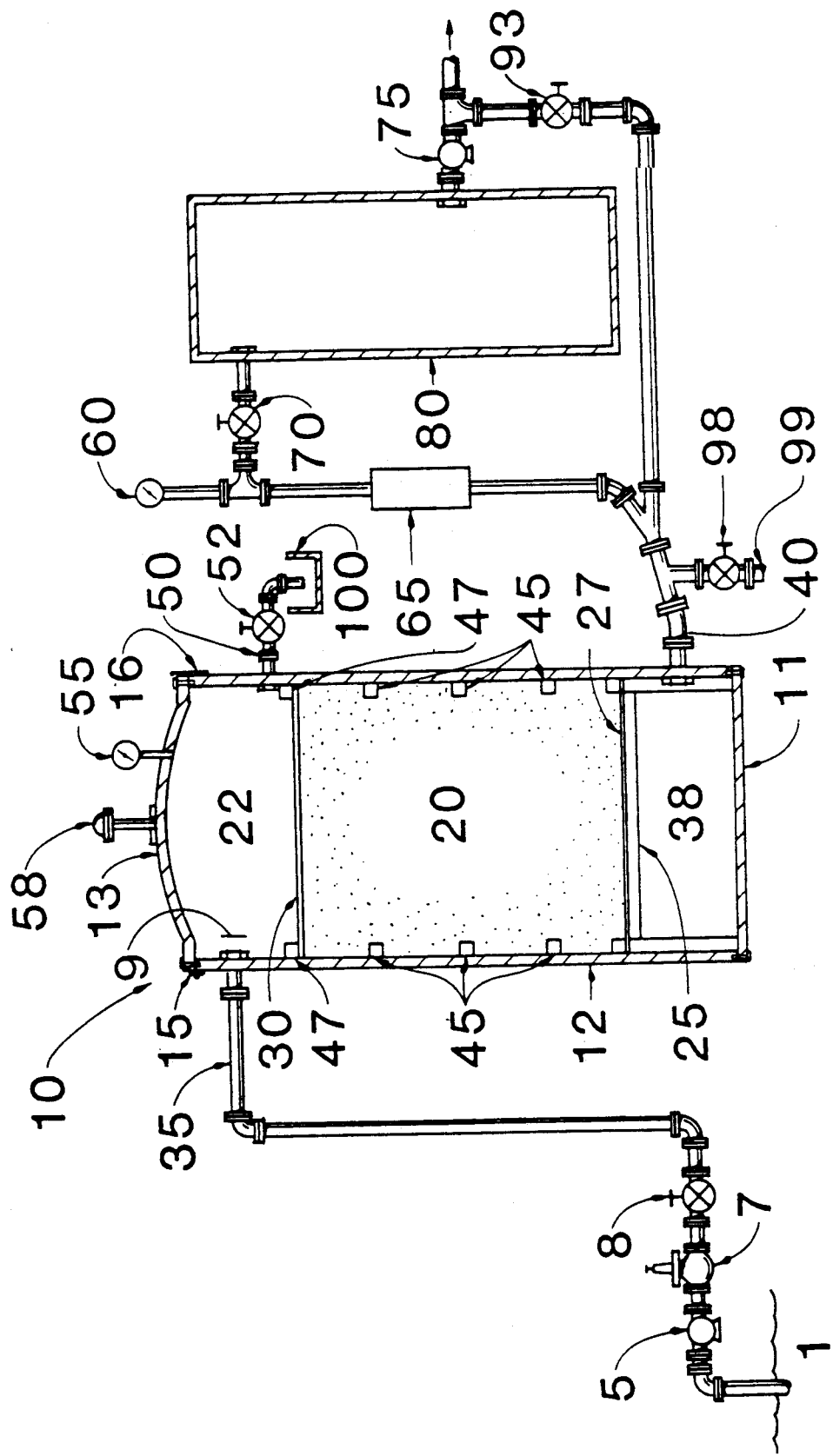
FIGURE 1 is a diagrammatic representation of the filtration system contemplated by the present invention.

Raw water 1 to be filtered (from a well, spring or the like) is supplied via pump means 5 to a pressure reducer 7 and a flow control valve 8 into raw water inlet pipe 35 where the raw water 1 is discharged into inlet area 22, of the container 10, which has a baffled entrance 9. The container 10 is divided into upper and lower chambers by a support plate 25, such as a screen or grating. The support plate may carry a layer of a geofilter cloth material 27 having a fine enough mesh size so that it adequately supports and maintains the filter material 20 above the support plate 25 and only allows the filtered water to pass therethrough.

The support plate 25 and/or the geofilter cloth material 27 support a sufficient quantity of filter material 20, such as sand or the like, which provides the necessary filtration of the raw water so that acceptable filtered drinking water is obtained. The filter material 20 typically has a depth of from about 6 inches to about 40 inches and preferably has a depth in the range of between 24 and 30 inches. If sand is used as the filter material, it is preferred that the sand be properly graded and have an effective grain size of 0.10 to 0.35 mm (effective grain size is that diameter of soil particles at which 10% of the sample's particles are finer, and 90% are coarser) and a uniformity coefficient of 1.2 to 3.0 (uniformity coefficient is a measure of the uniformity of soil particle diameter). The raw water passes through the filter system at a rate which can be slightly higher than a traditional slow sand filter (i.e. slightly greater than 0.08 m/hr) and the rate is controlled by a rate control device, e.g. a ball valve.

A geofilter cloth 30 is provided on top of the filter material 20 and it is held in place, around the entire periphery of the container, by a holding ring 47 or the like. The cloth separates the filter material 20 from the raw water 1 contained in the inlet area 22 of the container and provides a support medium upon which a "schmutzdecke" layer can form to filter out the impurities. When the geofilter cloth becomes sufficiently clogged, it can be either cleaned or replaced by removing cover 13 and holding ring 47 and accessing the interior of the container. The "schmutzdecke" or filter skin is a thin, slimy matting of material, largely organic in origin, through which the raw water passes before reaching the filter medium. The "schmutzdecke" consists of threadlike algae and numerous other forms of life including plankton, diatoms, protozoa, rotifers and bacteria. This layer is intensely active and the various microorganisms entrap and partially digest and break down the organic matter contained in the raw water passing through the filter system. The algae and the bacteria in the raw water accumulate on the "schmutzdecke" and simple inorganic salts are formed. At the same time, nitrogenous compounds are broken down and the nitrogen is formed. Additionally, some color is removed and a considerable portion of the inert suspended particles are mechanically removed.

Examples of geofilter cloths which have been used with success are TREVIRA ® spunbonds (non-woven fabric type 1155) a polyester monofilament material manufactured by Hoechst Fibers Industries of Spartanburg, S.C. and FILTER-X ® a polyvinylidene chloride monofilament material manufactured by Carthage Mills of Cincinnati, Ohio. Both of the above geofilter materials have been found to support a bacterial growth thereon, thereby helping to filter out bacteria, turbidities and other impurities which are contained in the raw water supply. Other synthetic materials which have the characteristic of supporting a bacterial "schmutzdecke" formation thereon are also considered within the spirit and scope of the present invention.

The lower chamber 38 communicates with a filtered water outlet pipe 40 which exhausts the filtered water out of the sealed container 10 through a rotometer or other flow indicator device 65 and a ball rate control valve 70 into a storage tank 80. Thereafter, the filtered water can undergo further water treatment, such as chlorination or the like.

The sealed container 10 can be of virtually any configuration, i.e. circular, square, etc., and typically has a width of at least 6 inches. The height of the unit can be anywhere from 18 inches to 8 feet. The raw water inlet pressure should be at least 2.5 psi and is preferably between 5 to 10 psi. The height of lower chamber 38 is preferably between 3 and 12 inches while the height of inlet area 22 can vary between 3 inches and 36 inches and is preferably between 6 and 12 inches.

The sidewall portion 12 of the sealed container 10 preferably has at least one baffle 45 (three baffles are shown in FIGURE 1) which extends around the entire periphery of the sidewall portion 12 to prevent the raw water from flowing downwardly along the sidewall of the container and thus not passing through the filter material 20. The purpose of the baffle 45 is to redirect the raw water inwardly so that it passes through the filter material and is sufficiently filtered before being exhausted.

In normal use, raw water 1 is supplied by inlet pipe 35 into inlet area 22. The raw water then flows downward through geofilter cloth 30, filter material 20, geofilter cloth 27, and support plate 25 into lower chamber 38. The filtered water is then exhausted out through outlet pipe 40 for use or for further water treatment such as chlorination or some other disinfectant treatment.

When the filtering system becomes sufficiently clogged through use, valves 8 and 70 are closed and quick drainage valve 52, in quick drainage pipe 50, is opened. The quick drainage pipe 50 is connected to a drain system, shown diagrammatically as 100, which quickly exhausts the raw water contained in area 22 above the level of quick drainage pipe 50. Thereafter, valve 98 of drainage pipe 99 can be opened to allow the water level in the container to continue filtration so that the water level drops below the level of the geofilter cloth 30. Then, the cover 13 can be opened and holding ring 47 and geofilter cloth 30 can be removed from the container 10. The new or cleaned geofilter cloth is then properly positioned in the container and quick drainage valve 52 and valve 98 are closed. Thereafter, the treated filtered water is slowly backfilled from tank 80, via pump 75 and valve 93, in to lower chamber 38. The treated water slowly passes upwardly through the support plate 25, the geofilter cloth 27, the filter material 20 and the geofilter cloth 30, to thereby remove any entrapped air bubbles and completely fill the container up to a level slightly above the geofilter cloth 30. It is important that the backfilling with treated water from tank 80 is done slowly so that the filter material 20 is relatively undisturbed. Once this has been done, the cover 13 is then inserted in place and the system is again activated. As raw water enters into area 22, any entrapped air can be removed by the air relief valve 58 until the container 10 is completely filled with water. The above arrangement is only one way of backfilling the system; other ways will be apparent to those skilled in the art and are considered to be within the scope of this invention.

An important feature of the present invention is that it allows quick access to the interior of the container so that the geofilter cloth 30 carrying the "schmutzdecke" can be quickly removed and either cleaned or replaced by a new geofilter cloth. Thereafter, the container can be reassembled and filtration can again commence. It is desirable that the cleaning/replacement operation take less than 60 minutes so that the biological organisms contained within the filter material are not killed. This ensures that once the system is restored to normal filtering operation it continuously produces high quality drinking water unlike the prior art slow sand filters which require a run-in period before the treated water is acceptable for human consumption.

Pressure gauge 55 or the like can be provided in sealed container 10 for measuring the water pressure of inlet area 22 while a pressure gauge 60 or the like can be provided somewhere in the filtered water system to measure the filtered water pressure. When a significant pressure differential between the two pressures gauges is noted, this indicates that the system requires cleaning and this is achieved by cleaning/replacement and backfilling procedure as discussed above. The filtering system can be set up with automatic control means (not shown) which monitor the respective pressures so that when a predetermined pressure differential is sensed, the system can be automatically shut down for cleaning.

It should be noted that the preceding description relates only to a preferred embodiment of the invention and many modifications thereof are possible without departing from the spirit and scope of the present invention. It is intended that all subject matter contained in the above description or shown in the accompanying drawings shall be interpreted as illustrative and not in the limiting sense.

I claim:

1. A slow rate filtration system for removing bacteria, viruses, algae, Giardia cysts, turbidity and other impurities in raw water supplied to a home or the like to provide suitable drinking water, said system comprising:
   a sealed container divided into an upper and a lower chamber by support means, said support means supporting thereon a quantity of filter material sufficient for removing undesired bacteria, viruses, algae, Giardia cysts, turbidity and other impurities from the raw water;
   said sealed container having raw water inlet means communicating with an inlet area above said filter material for supplying the raw water, and filtered water outlet means communicating with said lower chamber for exhausting filtered water from the container;
   a geofilter cloth being superimposed over all of the filter material in said sealed container, without any filter material being supported on top of the geofilter cloth, for supporting a biological "schmutzdecke" growth thereon; and
   means for facilitating removal and replacement of the geofilter cloth when contaminated, without substantially disturbing and destroying a biological growth in the filter material, to facilitate regeneration thereof and continuously provide adequately treated drinking water.

2. A filtration system in accordance with claim 1, wherein said filter material is sand which is properly graded for a slow sand filtration and has an effective size between about 0.10 and about 0.35 mm and a uniformity coefficient between about 1.2 and about 3.0.

3. A filtration system in accordance with claim 2, wherein sand has a depth of between about 6 inches and about 40 inches.

4. A filtration system in accordance with claim 3, wherein sand has a depth between about 24 inches and about 30 inches.

5. A filtration system in accordance with claim 1, wherein said geofilter cloth comprises a polyvinylidene chloride monofilament material.

6. A filtration system in accordance with claim 1, wherein said geofilter cloth comprises a polyester monofilament material.

7. A filtration system in accordance with claim 1, wherein said geofilter cloth comprises a synthetic material.

8. A filtration system in accordance with claim 1, further comprising means for supplying the raw water at an inlet pressure of at least about 2.5 psi.

9. A filtration system in accordance with claim 8, further comprising means for maintaining the inlet pressure within a range between about 5 and about 10 psi.

10. A filtration system in accordance with claim 1, wherein the sealed container has a width of at least 6 inches and a height between 18 inches and 8 feet.

11. A filtration system in accordance with claim 1, wherein the height of the inlet area is between about 3 inches and about 36 inches and includes a baffled entrance.

12. A filtration system in accordance with claim 11, wherein the height of the inlet area is between about 6 and about 12 inches.

13. A filtration system in accordance with claim 1, wherein the sidewall portion of the sealed container has at least one baffle extending around the periphery thereof for directing the raw water inwardly into the filter material so that an adequate filtration of the raw water is achieved.

14. A filtration system in accordance with claim 1, wherein said means for facilitating removal and replacement is a removable cover which provides quick access to the interior of the container for one of replacing and cleaning the geofilter cloth when it is sufficiently contaminated.

15. A filtration system in accordance with claim 1, wherein said container includes means for slowly backfilling the container.

16. A filtration system in accordance with claim 1, wherein means are provided for further treatment of the filtered water after filtration.

17. A filtration system in accordance with claim 1, wherein said support means including a second geofilter cloth which supports the filter material above the support means.

18. A filtration system in accordance with claim 1, wherein said geofilter cloth covers the entire top surface of the filter material.

19. A slow rate filtration system for removing bacteria, viruses, algae, Giardia cysts, turbidity and other impurities in raw water supplied to a home or the like to provide suitable drinking water, said system comprising:
   a sealed container divided into an upper and a lower chamber by support means, said support means supporting thereon a quantity of filter material sufficient for removing undesired bacteria, viruses, algae, Giardia cysts, turbidity and other impurities from the raw water;
   said sealed container having raw water inlet means communicating with an inlet area above said filter material for supplying the raw water, and filtered water outlet means communicating with said lower chamber for exhausting filtered water from the container;
   a geofilter cloth being superimposed over all of the filter material in said sealed container, without any filter material being supported on top of the geofilter cloth, for supporting a biological "schmutzdecke" growth thereon;
   means for facilitating removal and replacement of the geofilter cloth when contaminated, without substantially disturbing and destroying a biological growth in the filter material, to facilitate regeneration thereof and continuously provide adequately treated drinking water; and means for slowly backfilling the container with water for removing entrapped air and completely filling the container up to a level slightly above that of the geofilter cloth after removal and replacement and when initiating use of the filtration system.

20. A filtration system for removing bacteria, viruses, algae, Giardia cysts, turbidity and other impurities in raw water supplied to a home or the like to provide suitable drinking water for human consumption, said system comprising:

a sealed container divided into an upper and a lower chamber by support means, said support means supporting thereon a quantity of filter material sufficient for removing undesired bacteria, viruses, algae, Giardia cysts, turbidity and other impurities from the raw water;

said sealed container having raw water inlet means communicating with an inlet area above said filter material for supplying the raw water, and filtered water outlet means communicating with said lower chamber for exhausting filtered water from the container;

a geofilter cloth, supported by holding means, being superimposed over all of the filter material in said sealed container, without any filter material being supported on top of the geofilter cloth;

a biological "schmutzdecke" growth being grown on said geofilter cloth, during use of the filtration system, to remove bacteria, viruses, algae, turbidity, Giardia cysts and other impurities and provide suitable drinking water;

means for facilitating removal and replacement of the geofilter cloth when contaminated, without substantially disturbing and destroying a biological growth in the filter material, to facilitate regeneration thereof and continuously provide adequately treated drinking water; and means for slowly backfilling the container with filtered water to remove entrapped air and completely filling the container up to a level slightly above that of the geofilter cloth after removal and replacement and when initiating use of the filtration system without substantially disturbing the filter material during said slow backfilling.

* * * * *